Feb. 10, 1953  P. S. JOHNSON ET AL  2,628,344
HOT BEARING INDICATION APPARATUS
Filed July 15, 1948  3 Sheets-Sheet 1

INVENTORS
Paul S. Johnson and
Lester E. Spray.
BY
THEIR ATTORNEY

Feb. 10, 1953 P. S. JOHNSON ET AL 2,628,344
HOT BEARING INDICATION APPARATUS
Filed July 15, 1948 3 Sheets-Sheet 2

INVENTORS
Paul S. Johnson and
Lester E. Spray.
BY
THEIR ATTORNEY

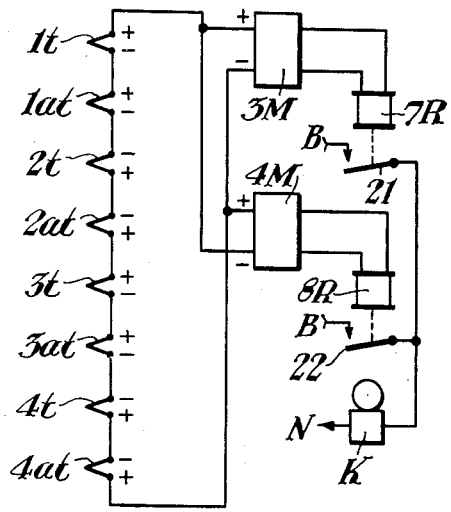
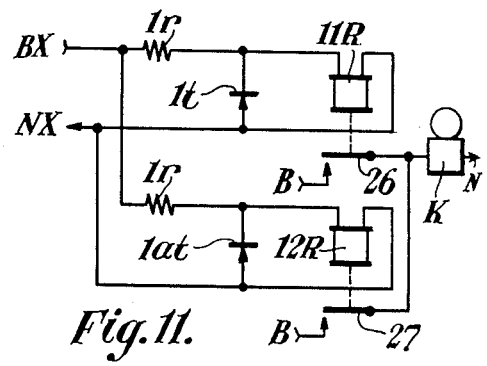
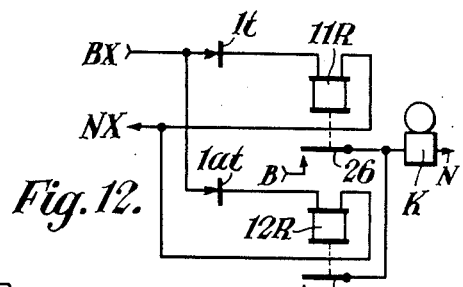
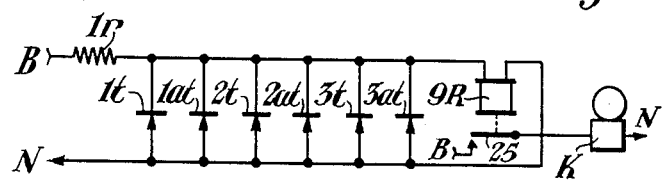
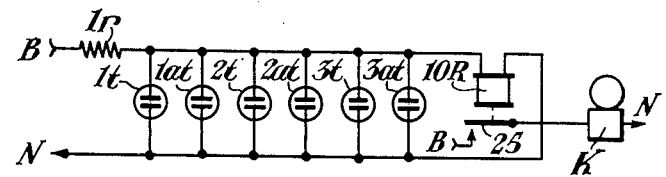
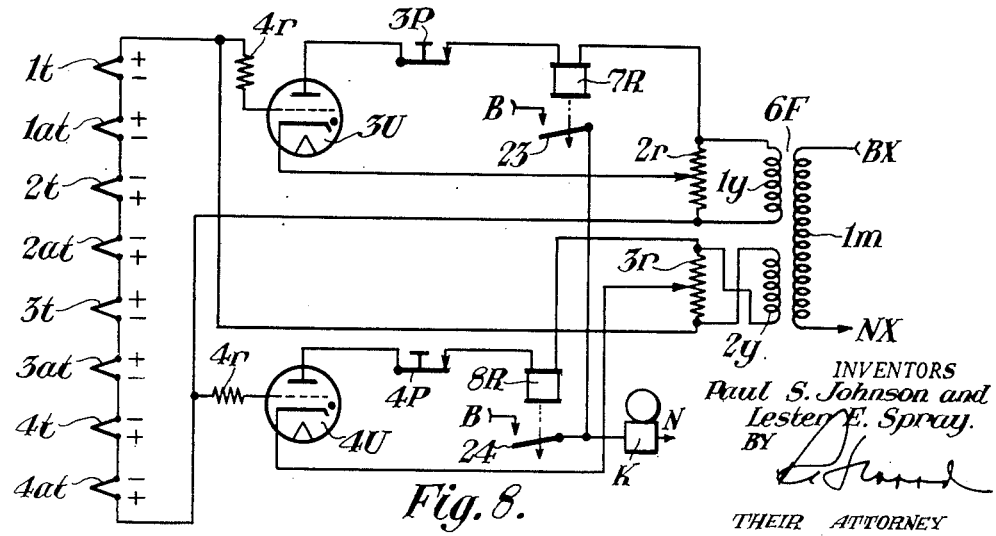
INVENTORS
Paul S. Johnson and
Lester E. Spray.
BY
THEIR ATTORNEY Patented Feb. 10, 1953

2,628,344

UNITED STATES PATENT OFFICE 2,628,344

HOT BEARING INDICATION APPARATUS

Paul S. Johnson, Washington, D. C., and Lester E. Spray, Wilkinsburg, Pa., assignors to Westinghouse Air Brake Company, a corporation of Pennsylvania Application July 15, 1948, Serial No. 38,796

8 Claims. (Cl. 340—47)

1

Our invention relates to hot bearing indication apparatus, and particularly to apparatus for indicating to railway enginemen and trainmen when an axle bearing of a railway car or locomotive is being overheated.

If an axle bearing which is being overheated is not discovered and appropriate remedial action taken promptly, the overheating may not only result in damage to the journal and its housing, but may also result in a broken axle, which might cause derailment of its car, possibly followed by wrecking of its train.

One feature of our invention is the provision of apparatus embodying heat responsive means comprising resistors having a high positive temperature coefficient of resistance, and also comprising resistors having a high negative temperature coefficient of resistance, for controlling hot bearing indication devices.

Another feature of our invention is the provision of apparatus embodying thermoelectric means, such for example as thermocouples, for controlling hot bearing indication devices.

Still another feature of our invention is the provision of apparatus embodying devices, which at atmospheric temperatures, are non-conductors or have high resistance to the passage of electric current of at least one polarity, but which, upon being heated a given amount above the atmospheric temperature range, become conductors of electric current.

We shall describe a few forms of apparatus embodying our invention, and shall then point out the novel features thereof in claims.

Figure 1:
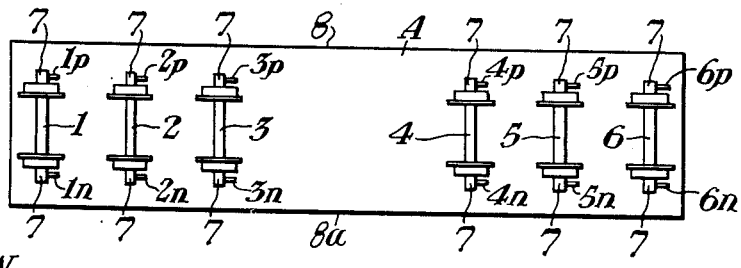
Figure 2:
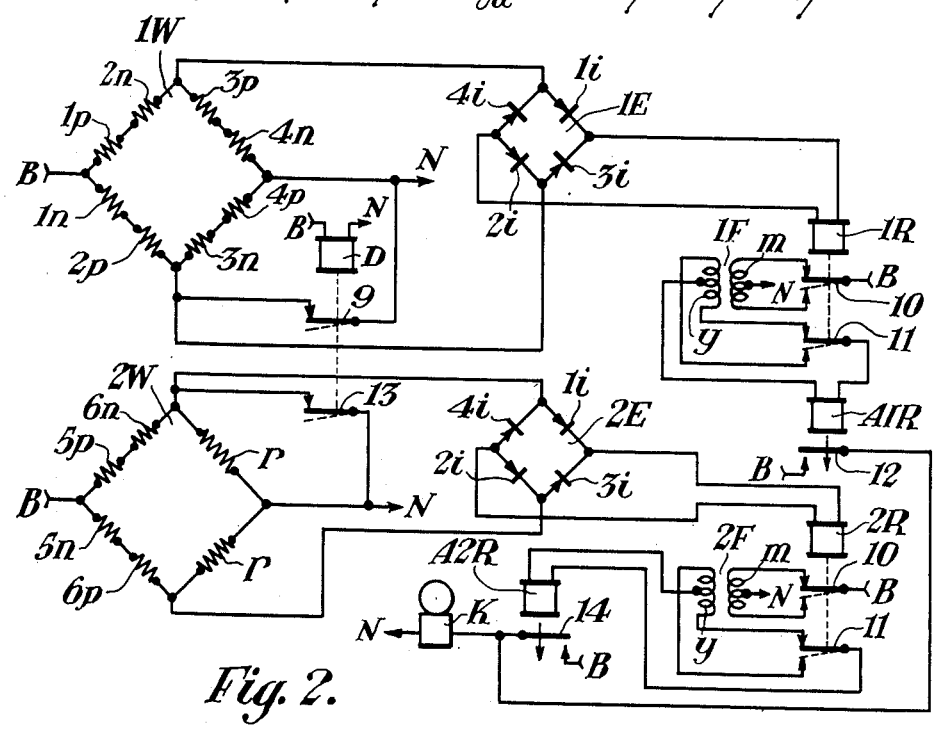
Figure 4:
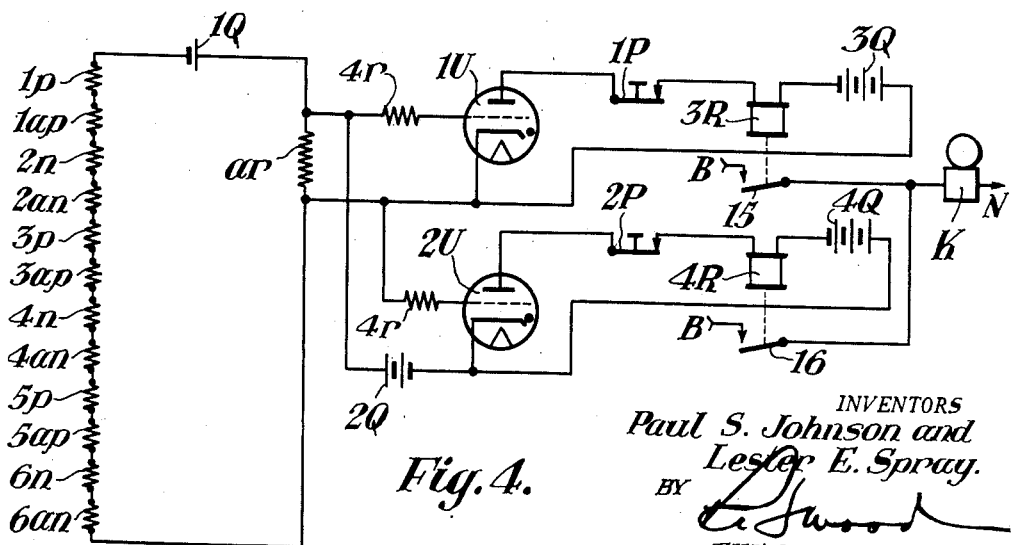
Figure 3:
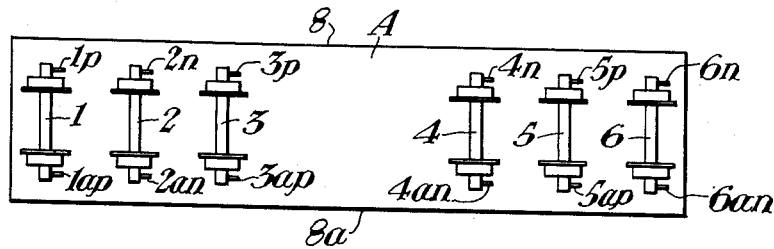
Figure 5:
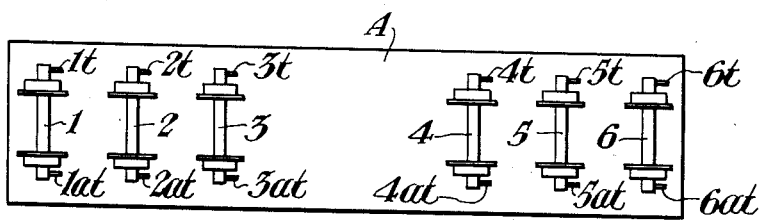
Figure 6:
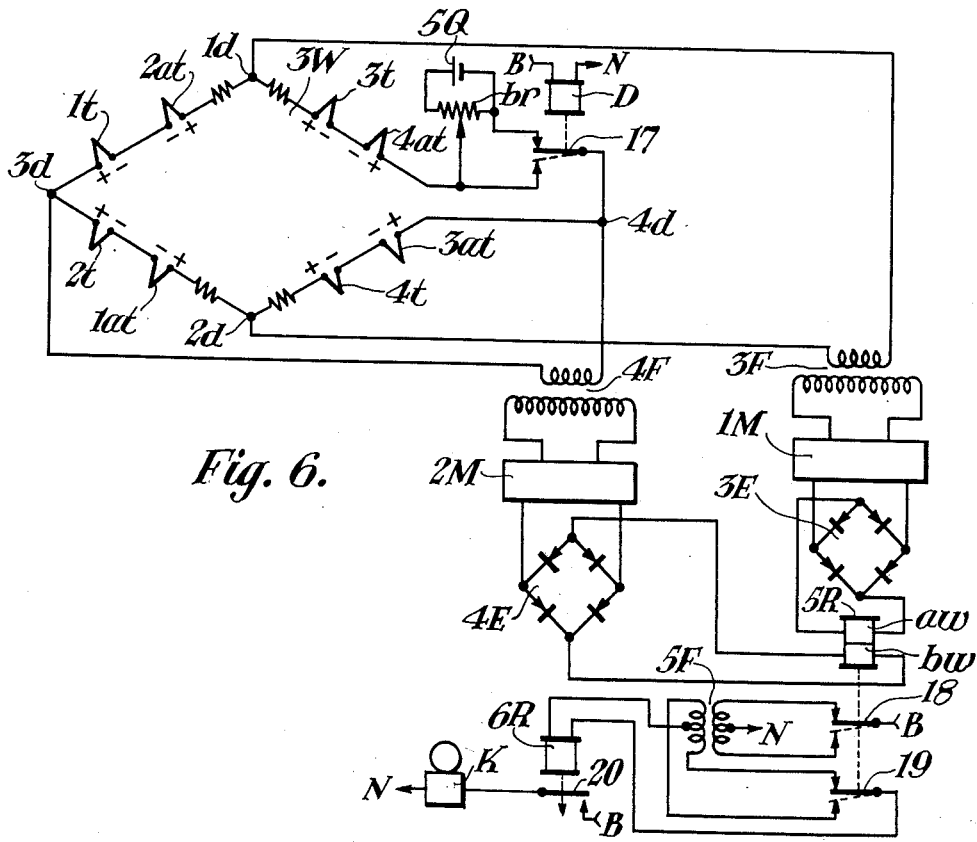

In the accompanying drawings, Fig. 1 is a diagrammatic view showing resistors having a high positive temperature coefficient of resistance, and other resistors having a high negative temperature coefficient of resistance, arranged in the journal housings of a railway car or locomotive; Fig. 2 is a diagrammatic view showing one form of apparatus embodying our invention, in which the resistors shown in Fig. 1 are used; Fig. 4 is a diagrammatic view showing a modification of the apparatus shown in Fig. 2, in which the resistors are arranged in the journal housings of a railway car or locomotive as shown in Fig. 3; Fig. 6 is a diagrammatic view showing another modification of the apparatus of Fig. 2, in which thermocouples are arranged in the journal housings as shown in Fig. 5; Fig. 7 shows a modification of the apparatus shown in Fig. 6; Fig. 8 shows another modification of the apparatus shown in Fig. 6; Fig. 9 is a diagrammatic view showing a modified form of apparatus embodying our invention, in which devices are used having high resistance to passage of current of a given polarity at atmospheric temperatures but becoming conductive at higher temperatures and are arranged as shown in Fig. 5; and Figs. 10, 11, and 12 show modifications of the form of apparatus shown in Fig. 9.

Similar reference characters refer to similar parts in each of the views.

Referring first to Fig. 1, the reference character A designates a railway vehicle of any suitable type which, as here shown, is provided with two trucks, each of which has three axles. The axles of vehicle A are designated by the reference characters 1 to 6, inclusive, and are provided, at their ends, with any suitable type of journal boxes 7.

Resistors each having a high positive temperature coefficient of resistance are provided, one for each of the axles 1 to 6, inclusive, and are designated by the reference characters $1p$ to $6p$, respectively. Other resistors having a high negative temperature coefficient of resistance are also provided, one for each of the axles 1 to 6, inclusive, and are designated by the reference characters $1n$ to $6n$, respectively. Resistors $1p$ to $6p$, inclusive, are placed to be subjected to the temperature of the bearings in boxes 7 at the ends of the axles which are adjacent a given side 8 of vehicle A, and resistors $1n$ to $6n$, inclusive, are placed to be subjected to the temperature of the bearings in boxes 7 at the opposite ends of the axles adjacent the opposite side $8a$ of vehicle A.

In Fig. 2, the resistors for axles 1 to 4, inclusive, shown in Fig. 1, are included in a Wheatstone bridge designated by the reference character $1W$, and the resistors for axles 5 and 6 are included in a second Wheatstone bridge designated by the reference character $2W$. It will be noted that each of the resistors $1p$ to $6p$, inclusive, which has a positive temperature coefficient of resistance, is connected in a bridge arm in series with one of the resistors $1n$ to $6n$, inclusive, which has a negative temperature coefficient of resistance. This arrangement compensates for changes in ambient temperature. If the ambient temperature should rise, the resistance of resistor 1p, for example, would increase, whereas the resistance of resistor 2n would decrease, so that the total resistance of the arm of bridge 1W which includes these two resistors would remain substantially the same. If, on the other hand, all the resistors had a positive temperature coefficient of resistance, or if all the resistors had a negative temperature coefficient of resistance, the total resistance of each bridge arm would vary upon variations in ambient temperature.

A coding device, designated by the reference character D, is constantly connected across a suitable source of current having terminals B and N. Device D therefore repeatedly opens and closes its contacts 9 and 13, so that bridge 1W is periodically unbalanced by a shunt path including contact 9 of coding device D across its arm which includes resistors 3n and 4p. As long as there is no abnormal heating of any of the bearings, bridge 1W will be balanced during the periods when contact 9 of coder D is open.

Pulses of current are therefore normally supplied to a rectifier 1E for periodically energizing a code following relay 1R during the closed periods of contact 9 of coder D. Rectifier 1E may be of any suitable design such, for example, as the well-known copper oxide rectifier bridge type comprising half-wave units 1i, 2i, 3i, and 4i.

Relay 1R will therefore normally repeatedly close its contacts 10 and 11 at their front and back points alternately for effecting energization of a decoding relay, designated by the reference character A1R, through a decoding transformer 1F which has primary and secondary windings m and y, respectively. Relay A1R on account of being slow releasing, maintains its contact 12 in the open position in response to such control by relay 1R, so that the indication device, shown as a bell K, remains deenergized, and therefore inactive.

We shall assume that the temperature of the bearing for axle 1, where resistor 1p is located, begins to rise. The resistance of resistor 1p will therefore increase, thereby unbalancing bridge 1W during the open as well as the closed periods of contact 9 of coder D. As the overheating at resistor 1p increases further, bridge 1W will become unbalanced to such an extent that relay 1R will retain its contacts 10 and 11 constantly closed at their front points.

Relay A1R is thereby deenergized, so that indication device K becomes energized by a circuit passing from terminal B, through contact 12 of relay A1R, and indication device K to terminal N. The enginemen and trainmen, in response to the indication thus given by device K, will then proceed to take appropriate action to avoid further overheating of axle 1 with probable damage.

Resistors r, shown in two of the arms of bridge 2W, may be placed in any suitable location on vehicle A, and each should include two portions, one of which has a positive temperature coefficient of resistance, and the other of which has a negative temperature coefficient of resistance in order to compensate for variations in the ambient temperature.

In the arrangement shown in Fig. 2, the resistors for the two ends of each axle are placed in adjacent bridge arms, so that if the bearings at the same time, as sometimes happens when an axle becomes bent, the unbalancing effect of the resistors for the two ends of the axle will be additive.

Referring next to Fig. 3, each alternate axle is here provided with resistors each of which has a positive temperature coefficient of resistance, whereas each of the intervening axles is provided with resistors each of which has a negative temperature coefficient of resistance. Accordingly, resistors 1p and 1ap of axle 1, resistors 3p and 3ap of axle 3, and resistors 5p and 5ap of axle 5 have a positive temperature coefficient of resistance, whereas resistors 2n and 2an of axle 2, resistors 4n and 4an of axle 4, and resistors 6n and 6an of axle 6 have a negative temperature coefficient of resistance. This arrangement of the resistors compensates for any difference in ambient temperature between the ends of the axles which are adjacent side 8 of vehicle A and the opposite ends of the axles which are adjacent the opposite side 8a of vehicle A. If vehicle A were being moved a considerable distance over a straight stretch of track, such as on plains or desert territory, with the axle housings adjacent one side of vehicle A in the shade while those on the opposite side were in the direct sunlight, there might be a considerable difference in the ambient temperature between the ends of the axles adjacent the two sides of vehicle A.

The resistors located as shown in Fig. 3 are arranged in series with each other in a circuit, shown in Fig. 4, passing from the positive terminal of a suitable source of current, such as a battery 1Q, through resistors 1p to 6an, inclusive, and a control resistor ar, back to battery 1Q. With both the resistors of each axle having a positive temperature coefficient of resistance, or with both the resistors of each axle having a negative temperature coefficient of resistance, if an axle, such, for example, as axle 1 should become bent, causing the temperature of both of its ends to rise, the effect produced by resistors 1p and 1ap would be additive.

With half of the total number of resistors on each side of a vehicle having a positive temperature coefficient of resistance, and with the other half of the resistors on each side of the vehicle having a negative temperature coefficient of resistance, compensation is provided for changes in ambient temperature, so that with no abnormal heating at either end of any axle, the voltage across resistor ar will be constant.

Two gas tubes, designated by the reference characters 1U and 2U, such, for example, as the well-known thyratron type, are controlled by changes in voltage produced across resistor ar by changes in resistance of any of the axle resistors due to abnormal heating in the corresponding axle housing. Usual protective resistors, designated by the reference character 4r, are provided for the grids for these tubes.

A negative potential, sufficient to prevent plate current from flowing, is maintained on the grid of tube 1U by the normal potential drop across resistor ar. A negative potential, sufficient to prevent plate current flow, is maintained on the grid of tube 2U by a suitable source of current, such as a battery 2Q, connected in opposition to the potential drop across resistor ar. Indication relays 3R and 4R are controlled by the plate circuits of tubes 1U and 2U which are supplied with current from suitable sources such as batteries 3Q and 4Q, respectively. The plate circuits for tubes 1U and 2U are provided with resetting devices, here shown as push button circuit controllers 1P and 2P, respectively.

We shall assume that the resistance of resistor $I_p$ increases, due to abnormal heating in the corresponding axle housing of axle 1. The drop across resistor $ar$ is thereby reduced. When this drop is sufficiently reduced, the grid of tube 1U will become enough less negative to permit plate current to flow in the plate circuit for tube 1U for energizing relay 3R, this circuit passing from battery 3Q through the winding of relay 3R, resetting device 1P, and tube 1U, back to battery 3Q.

Relay 3R, upon becoming energized, completes a circuit for energizing indication device K, this circuit passing from terminal B, through contact 15 of relay 3R, and indication device K to terminal N. Upon taking appropriate action because of the overheating of axle 1, a trainman will depress push button 1P for restoring the plate circuit for tube 1U to its normal condition. Relay 3R will thereupon become deenergized, causing indication device K to also become deenergized.

We shall now assume that the resistance of resistor $2n$ decreases due to abnormal heating in the corresponding axle housing of axle 2. The potential drop across resistor $ar$ will thereby be increased. The grid of tube 1U will therefore be more negative, so that it will remain inactive, but the grid of tube 2U will be less negative. When the resistance of resistor $2n$ becomes sufficiently reduced, the grid of tube 2U will become enough less negative to permit plate current to flow for energizing relay 4R in the plate circuit passing from battery 4Q, through the winding of relay 4R, push button 2P, and tube 2U, back to battery 4Q.

Indication device K will therefore become energized by a circuit including contact 16 of relay 4R. Upon taking appropriate action in response to the indication given by device K, a trainman will depress push button 2P for resetting the plate circuit for tube 2U. Relay 4R will therefore become deenergized, causing indication device K to in turn also become deenergized.

Instead of having resistors with a high positive temperature coefficient of resistance for some of the bearings, and resistors with a high negative temperature coefficient of resistance for the other bearings, all these resistors could have a high positive temperature coefficient of resistance, and resistor $ar$ could also have a high positive temperature coefficient of resistance to compensate for ambient temperature changes, or all the bearing resistors could have a high negative temperature coefficient of resistance and resistor $ar$ could then also have a high negative temperature coefficient of resistance to compensate for ambient temperature changes.

Referring now to Fig. 5, the heat responsive devices here shown at each end of each axle are all alike.

In the modified form of apparatus shown in Fig. 6, heat responsive devices $1t$, $1at$, $2t$, $2at$, etc., as shown in Fig. 5, are employed, which are of the thermoelectric type, such for example as thermocouples. The thermocouples for axles 1 to 4, inclusive, are arranged two in each arm of a Wheatstone bridge 3W. The two thermocouples which are included in each arm of bridge 3W are oppositely poled in order to compensate for any effect which might be produced on them by ambient temperature conditions.

A coding device D is constantly energized from terminals B and N. Contact 17 of device D is therefore repeatedly closed at its front and back points alternately. During the periods while the back point of contact 17 is closed, bridge 3W is balanced, so that no voltage will be impressed across any of its arms if there is no abnormal heating of any axle housing. During the periods when the front point of contact 17 of coding device D is closed, a potential is supplied to bridge 3W from a suitable source of current, such as a battery 5Q, through the portion $br$ of a variable resistor.

This produces a potential drop across points $1d$ and $2d$ of bridge 3W for energizing winding $aw$ of an indication relay 5R through a transformer 3F, an amplifier 1M, and a rectifier 3E. At the same time, there is a potential drop across points $3d$ and $4d$ of bridge 3W for energizing winding $bw$ of indication relay 5R through a transformer 4F, an amplifier 2M, and a rectifier 4E. Windings $aw$ and $bw$ are so connected that they work together to operate the contacts 18 and 19 of relay 5R.

Relay 5R is thus periodically energized in step with contact 17 of coder D, so that contacts 18 and 19 of relay 5R are repeatedly closed alternately at their front and back points. With the contacts of relay 5R thus operated, a decoding indication relay 6R will be energized through transformer 5F, so that its contact 20 will remain open, causing indication device K to remain deenergized.

We shall assume that any one of the axle housings starts to heat, so that the corresponding thermocouple produces an electric potential in bridge 3W. When this potential becomes sufficiently high, relay 5R will be energized while contact 17 of coding device D is closed at its back point as well as when it is closed at its front point, so that relay 5R will retain its contacts 18 and 19 closed at their front points, causing relay 6R to be deenergized, and indication device K to be operated by its circuit which includes contact 20 of relay 6R.

In the modified form of apparatus shown in Fig. 7, equal numbers of the thermocouples are oppositely poled in series with each other. The thermocouples for the two ends of each axle are poled in the same direction so that they will produce potential of the same polarity if both ends of the associated axle should become heated because of the axle becoming bent.

With this arrangement, if any one of the thermocouples which is poled in the same direction as thermocouple $1t$ produces a potential because of heating of the associated axle housing, an indication relay 7R will become energized through a suitable amplifier 3M, which is arranged to be effective for this purpose in response to potentials of only the polarity indicated on the drawing adjacent the symbol for amplifier 3M. With relay 7R energized, indication device K will be energized by a circuit including contact 21 of relay 7R.

If, on the other hand, any one of the thermocouples which is poled in the opposite direction, the same as thermocouple $2t$, produces a potential due to its associated axle housing becoming heated, a second indication relay 8R will become energized through a suitable amplifier 4M. Indication device K will then become operated by a circuit which includes contact 22 of relay 8R.

In the apparatus shown in Fig. 8, which is a modified form of the apparatus shown in Fig. 7, gas tubes 3U and 4U, such as the well-known thyratron type, are controlled by the thermocouples. Primary winding $1m$ of a transformer 6F is energized from a suitable source of alternating current having terminals BX and NX. The plate circuit for tube 3U is energized from secondary winding 1y of transformer 6F, through the portion 2r of a variable resistor, and a bias voltage is supplied to the grid of tube 4U by the other portion of the same resistor. Tube 4U is similarly energized from secondary winding 2y of transformer 6F through a second variable resistor which has a portion 3r.

If a thermocouple which is poled in the same direction as thermocouple 1t produces a voltage because the corresponding axle housing becomes abnormally heated, it will make the grid of tube 3U less negative, so that a slow release neutral indication relay 7R will become energized by the plate circuit of tube 3U. Indication device K will then become energized by a circuit including contact 23 of relay 7R.

If a thermocouple which is poled in the same direction as thermocouple 4at produces a potential due to abnormal heating of the associated axle housing, it will make the grid of tube 4U less negative, so that a second slow release relay 8R will become energized by the plate circuit of tube 4U. With relay 8R energized, indication device K will then be energized by a second circuit including contact 24 of relay 8R. Resetting devices shown as push buttons 3P and 4P are provided for tubes 3U and 4U, respectively.

In the form of apparatus embodying our invention as shown in Fig. 9, heat responsive devices, located as shown in Fig. 5, are employed of a type such as the well-known copper oxide half-wave rectifier units, which at normal temperatures have high resistance to passage of current of a given polarity but which, upon becoming heated, become conductors for such current. Although we have shown the units for only axles 1, 2, and 3 connected across the circuit for an indication relay 9R, the units for axles 4, 5, and 6 may be similarly connected across the circuit for relay 9R.

Relay 9R is normally energized by a circuit passing from terminal B, through a resistor 1r, and the winding of relay 9R, to terminal N. With relay 9R energized, indication device K is deenergized, because its circuit is open at contact 25 of relay 9R.

If any one of the half-wave rectifier units, such for example, as unit 1t, becomes conducting due to overheating of the corresponding axle housing, the winding of relay 9R will be shunted by such unit, causing relay 9R to be deenergized. With relay 9R deenergized, indication device K will be operated by its circuit including contact 25 of relay 9R.

In the modified form of apparatus shown in Fig. 10, the heat responsive devices are of a suitable gas tube type which prevent the flow of electric current at normal atmospheric temperatures, but which, upon becoming heated, become conducting. Relay 10R is normally energized by a circuit which is similar to the circuit previously traced for relay 9R, so that indication device K is normally deenergized. If any one of the gas tubes becomes conducting due to abnormal heating of the associated axle housing, relay 10R will become shunted by such gas tube, causing its contact 25 to close, and to thereby complete the circuit for operating indication device K.

In the form of apparatus shown in Fig. 11, heat responsive devices arranged as shown in Fig. 5 are employed which are of the asymmetric unit type, such as the copper oxide half-wave rectifier. An indication relay is here provided for each asymmetric unit. We have shown only the circuits for units 1t and 1at, for example, for controlling the corresponding relays 11R and 12R. These relays are of the direct current type, which will retain their back contacts open if they are energized by direct current, but will permit these contacts to close if alternating current is supplied to their windings.

The control circuit for each of these relays is connected across terminals BX and NX of a suitable source of alternating current. The current from one half of the alternating current wave is normally shunted through the asymmetric units, whereas the relays are energized by pulsating direct current from the other half of the alternating current wave.

Relay 11R, for example, is normally energized by pulsating current passing from terminal BX, through a resistor 1r, and winding of relay 11R to terminal NX. Pulsating current from the other half wave of alternating current passes from terminal NX, through unit 1t, and resistor 1r to terminal BX.

If unit 1t should become conducting because of abnormal heating of the corresponding axle housing, the winding of relay 11R will be shunted by unit 1t, causing relay 11R to become deenergized and thereby complete a circuit through its contact 26 for energizing indication device K.

In the modified form of apparatus which is shown in Fig. 12, each asymmetric unit is connected in series with the associated indication relay, instead of in multiple as is shown in Fig. 11. Relay 11R is therefore normally energized by pulsating current passing from terminal BX, through unit 1t, and the winding of relay 11R to terminal NX. Contact 26 of relay 11R is therefore open, so that indication device K is deenergized.

If unit 1t should become conducting in the high resistance direction because of abnormal heating of the associated axle housing, or if it should become short-circuited, alternating current would be supplied to the winding of relay 11R from terminals BX and NX, and then relay 11R would release its contact 26, causing indication device K to be operated. It follows that, with the form of apparatus shown in Fig. 12, any failure, as well as overheating, of an asymmetric unit, such as a short circuit, or an open circuit, will cause the hot bearing indication device K to be operated.

Although we have herein shown and described only a few forms of apparatus embodying our invention, it is understood that various changes and modifications may be made therein within the scope of the appended claims without departing from the spirit and scope of our invention.

Having thus described our invention, what we claim is:

1. Heat indication apparatus for two appliances comprising, in combination, a thermoelectric device for each of said appliances each placed to be affected by the temperature of the associated appliance, a Wheatstone bridge in one arm of which said thermoelectric devices are connected in opposition so that electric potentials generated by said thermoelectric devices oppose each other, indication means, and means controlled by the potential drop across opposite points of said bridge for operating said indication means in response to electric potential produced by either of said thermoelectric devices because of abnormal heating of the associated appliance.

2. Heat indication apparatus for an appliance comprising, in combination, a thermoelectric device placed to be affected by the temperature in said appliance, a Wheatstone bridge in one arm of which said thermoelectric device is connected, means for periodically inserting an electric potential in one arm of said bridge, code following means, means controlled by the voltage drop produced periodically across opposite points of said bridge by said electric potential for periodically operating said code following means, means controlled by voltage drop produced across opposite points of said bridge by said thermoelectric device in response to abnormal heating of said appliance for constantly operating said code following means during the off periods of said electric potential, and indication means controlled by said code following means.

3. Hot bearing indication apparatus for a plurality of axle bearings comprising, in combination, a thermoelectric device for each of said axle bearings each placed to be affected by the temperature of the associated axle bearing, electric circuit means including an even number of said thermoelectric devices connected in series with each other so that electric potential produced by any one of a given half of said even number of thermoelectric devices is in a given direction in said circuit means and electric potential produced by any one of the other half of said even number of thermoelectric devices is in the opposite direction, indication means, and means controlled by any one of said thermoelectric devices for effecting operation of said indication means if the corresponding axle bearing becomes abnormally heated.

4. Heat indication apparatus for a plurality of elements comprising, in combination, a plurality of thermo-electric devices one for each of said elements, each of said thermo-electric devices placed to be controlled to generate an electric potential in response to abnormal heating of the corresponding one of said elements, a control circuit arrangement in which a given number of said thermo-electric devices are connected in series to supply an electric potential in a given direction and an equal number of said thermo-electric devices are connected in series with each other and with said given number of said thermo-electric devices to supply an electric potential in the opposite direction, indication means, and means controlled by the electric potential generated by any one of said thermo-electric devices in said control circuit arrangement for operating said indication means.

5. Heat indication apparatus for a plurality of elements comprising, in combination, a plurality of thermo-electric devices one for each of said elements, each of said thermo-electric devices placed to be controlled to generate an electric potential in response to abnormal heating of the corresponding one of said elements, a Wheatstone bridge circuit arrangement in which each of the four arms includes one of said thermo-electric devices connected to supply an electric potential in a given direction and also includes another of said thermo-electric devices connected to supply an electric potential in the opposite direction, indication means, and means controlled by the potential drop across opposite points of said bridge produced by electric potential generated by any one of said thermo-electric devices for operating said indication means in response to abnormal heating of the corresponding one of said elements.

6. Heat indication apparatus for a plurality of elements comprising, in combination, a plurality of thermo-electric devices one for each of said elements, each of said thermo-electric devices placed to be controlled to generate an electric potential in response to abnormal heating of the corresponding one of said elements, a Wheatstone bridge circuit arrangement in which each of the four arms includes one of said thermo-electric devices connected to supply an electric potential in a given direction and also includes another of said thermo-electric devices connected to supply an electric potential in the opposite direction, means for periodically inserting an auxiliary electric potential in one of said arms of said bridge, code following means, means controlled by the voltage drop produced periodically across opposite points of said bridge by said auxiliary electric potential for periodically operating said code following means, means controlled by voltage drop produced across opposite points of said bridge by any one of said thermo-electric devices in response to abnormal heating of the corresponding one of said elements for constantly operating said code following means during the off periods of said auxiliary electric potential, and indication means controlled by said code following means.

7. Heat indication apparatus for a plurality of elements comprising, in combination, a plurality of thermo-electric devices one for each of said elements, each of said thermo-electric devices placed to be controlled to generate an electric potential in response to abnormal heating of the corresponding one of said elements, a control circuit arrangement in which a given number of said thermo-electric devices are connected in series to supply an electric potential in a given direction and an equal number of said thermo-electric devices are connected in series with each other and with said given number of said thermo-electric devices to supply an electric potential in the opposite direction, first amplifying means for said electric potential in said given direction, second amplifying means for said electric potential in said opposite direction, indication means, means controlled by said first amplifying means for operating said indication means in response to electric potential generated by any one of said given number of electro-responsive devices, and means controlled by said second amplifying means for operating said indication means in response to electric potential generated by any one of said equal number of thermo-electric devices.

8. Heat indication apparatus for a plurality of elements comprising, in combination, a plurality of thermo-electric devices one for each of said elements, each of said thermo-electric devices placed to be controlled to generate an electric potential in response to abnormal heating of the corresponding one of said elements, a control circuit arrangement in which a given number of said thermo-electric devices are connected in series to supply an electric potential in a given direction and an equal number of said thermo-electric devices are connected in series with each other and with said given number of said thermo-electric devices to supply an electric potential in the opposite direction, a first gas tube, a second gas tube, means for normally supplying a negative bias voltage to the grid of each of said gas tubes, means controlled by electric potential generated by any one of said given number of thermo-electric devices for making the grid of said first gas tube less negative, means controlled by electric potential generated by any one of said equal number of thermo-electric devices for making the grid of said second gas tube less negative, and indication means operated by means controlled by said first and second gas tubes in response to electric potential generated by any one of said given number of thermo-electric devices or by any one of said equal number of thermo-electric devices respectively.

PAUL S. JOHNSON.
LESTER E. SPRAY.

REFERENCES CITED

The following references are of record in the file of this patent:

UNITED STATES PATENTS

| Number | Name | Date |
| --- | --- | --- |
| 2,126,115 | Jordi | Aug. 9, 1938 |
| 2,473,940 | Clark | June 21, 1949 |
| 2,478,000 | Miller | Aug. 2, 1949 |

FOREIGN PATENTS

| Number | Country | Date |
| --- | --- | --- |
| 401,667 | Germany | Sept. 8, 1924 |